Dec. 15, 1970  D. S. YORKSIE  3,548,318
RAMP FUNCTION GENERATOR
Filed Aug. 28, 1968  3 Sheets-Sheet 1
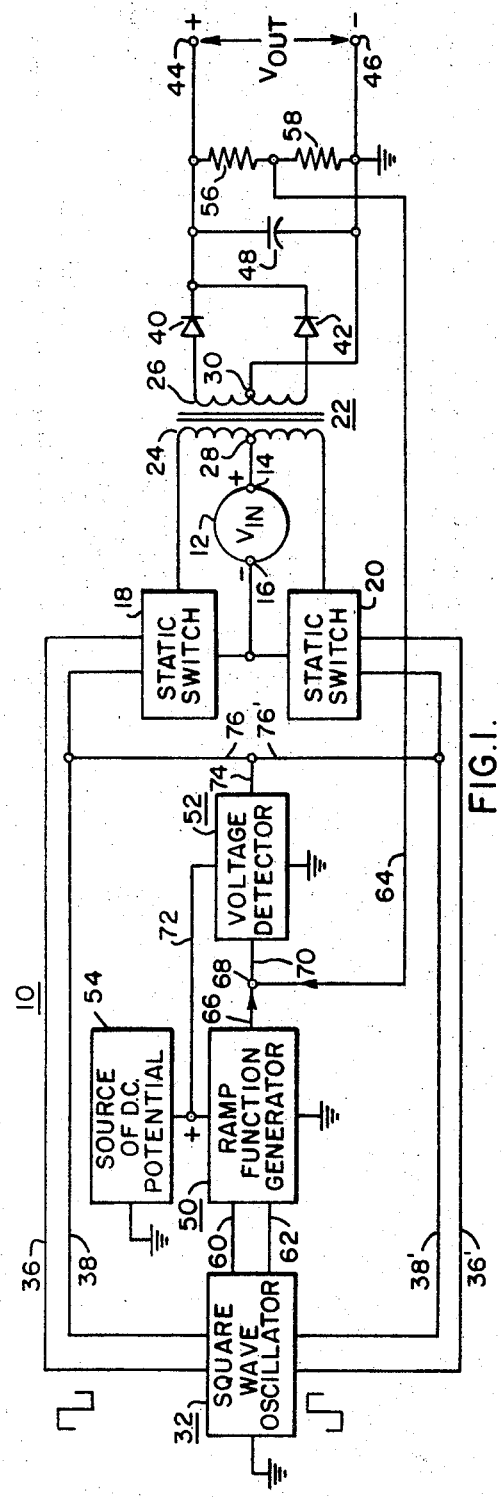
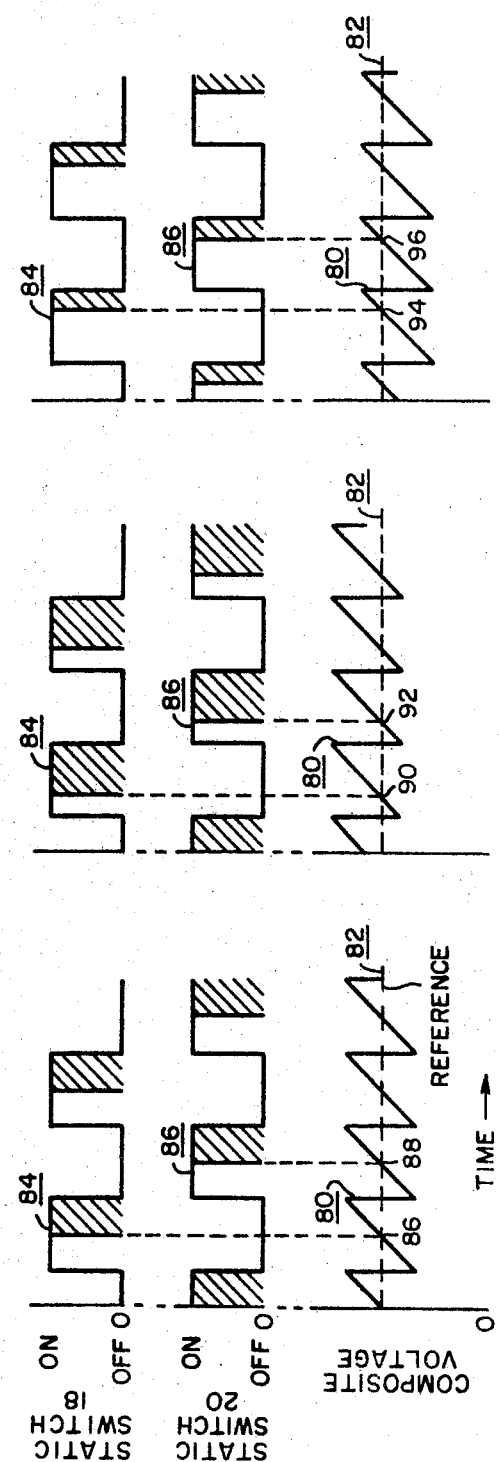
INVENTOR
Daniel S. Yorksie
BY
Donald R. Lackey
ATTORNEY

United States Patent Office 3,548,318
Patented Dec. 15, 1970

3,548,318
RAMP FUNCTION GENERATOR
Daniel S. Yorksie, Lima, Ohio, assignor to Westinghouse Electric Corporation, Pittsburgh, Pa., a corporation of Pennsylvania
Filed Aug. 28, 1968, Ser. No. 755,857
Int. Cl. H03k 4/50, 5/08
U.S. Cl. 328—35                                5 Claims

ABSTRACT OF THE DISCLOSURE

A ramp function generator for providing a symmetrical saw-tooth voltage waveform in response to a square wave oscillator of the type having first and second switching devices which are alternately conductive. The ramp function generator includes first, second and third capacitors, with the first and second capacitors being charged alternately in response to the conductive states of the first and second switching devices in the square wave oscillator. Each time the first and second switching devices in the square wave oscillator switch, or change conductive states, the third capacitor is effectively connected in series with the charged first or second capacitor, which distributes the charge between the charged capacitor and the third capacitor. The third capacitor then discharges at a predetermined rate to provide the desired ramp function. Output terminals connected across the third capacitor provide a saw-tooth voltage waveform having a frequency equal to twice that of the square wave oscillator, and synchronized therewith.

BACKGROUND OF THE INVENTION

Field of the invention

The invention relates in general to new and improved circuits for providing saw-tooth voltage waveforms, and more particularly to a new and improved circuit for providing a saw-tooth voltage waveform which is synchronized with the output voltage of a square wave oscillator, and which has a frequency equal to twice that of the square wave oscillator.

Description of the prior act

In the prior act, it is common in DC to DC conversion, to alternately switch two power switching elements, such as power transistors, connected to an output transformer, in response to a square wave oscillator which alternately drives the two power switching elements. The output voltage is regulated by pulse width modulating the conduction time of the power switching elements. One method of accomplishing this is to generate a ramp function voltage at twice the frequency of the square wave oscillator, and add this ramp function or saw-tooth voltage waveform to a voltage having a magnitude responsive to the voltage to be regulated. This composite voltage is then compared with a reference voltage in a voltage detector, which removes the drive from the power switching elements whenever the magnitude of the composite voltage waveform exceeds the magnitude of the reference voltage.

Proper operation of this type of regulator can only be achieved with a symmetrical ramp function which is accurately synchronized with the square wave oscillator. An unsymmetrical and/or unsynchronized ramp function may cause an unbalanced current in the output transformer which may lead to saturation and destruction of the power switching elements, and it may also cause a switching element to double its intended switching frequency, which doubles its losses.

A conventional saw-tooth voltage waveform generator circuit using a unijunction transistor and capacitor is unreliable in this particular application, because of the tendency to saturate the power transformer due to inherent unbalance in the circuit. Base one (B1) of the unijunction is connected to the collector electrodes of both of the switching elements in the square wave oscillator. However, the voltages appearing at the collectors of the switching elements during their transition from one conductive state to another may be such that the capacitor may not completely discharge to the same point each time the switching elements in the square wave oscillator change conductive states. It is essential that the voltage at base one (B1) of the unijunction drop below its emitter voltage long enough for the capacitor connected to the emitter to discharge each half cycle of the square wave. Since, due to the different switching characteristics of the switching elements, the voltages may not be exactly the same each time, the capacitor may discharge to a different point each half cycle, producing an unsymmetrical ramp function, which may lead to an unbalanced current in the output transformer.

Thus, it would be desirable to provide a reliable but low cost ramp function generator which may be synchronized with a square wave oscillator to provide symmetrical ramp functions at twice the frequency of the square wave oscillator.

SUMMARY OF THE INVENTION

Briefly, the present invention is a new and improved ramp function generator, which includes first, second and third capacitors, a plurality of asymmetrically conductive devices or rectifiers, and resistors. The first and second capacitors are connected to charge alternately, in response to the conductive states of the first and second switching devices of a square wave oscillator, and the third capacitor is connected such that it is isolated from the first and second capacitors, except during the short period of time that the first and second switching devices of the square wave oscillator are switching. During this switching period, the third capacitor is effectively connected in series with whichever capacitor of the first and second capacitors is charged, which distributes the charge from the charged first or second capacitor, between the charged capacitor and the third capacitor. Once the charge is distributed, the third capacitor is again isolated from the first and second capacitors, and it is discharged at a predetermined rate to provide the desired slope of the ramp function. The first and second switching devices of the square wave oscillator switch each half cycle of the square wave generated. Thus, the output frequency of the ramp function generator is synchronized with the square wave voltage, and it has a frequency equal to twice that of the square wave oscillator. The ramp function is accurately produced each half cycle of the square wave voltage, to provide the required symmetry in the generated saw-tooth voltage waveform.

BRIEF DESCRIPTION OF THE DRAWING

Further advantages and uses of the invention will become more apparent when considered in view of the following detailed description and drawings, in which:

FIG. 1 is a schematic and block diagram of regulated power conversion apparatus of the type which may utilize the teachings of the invention;

FIGS. 2A, 2B and 2C are graphs illustrating the proper operation of the apparatus shown in FIG. 1;

DESCRIPTION OF THE PREFERRED EMBODIMENTS

Figure 3:
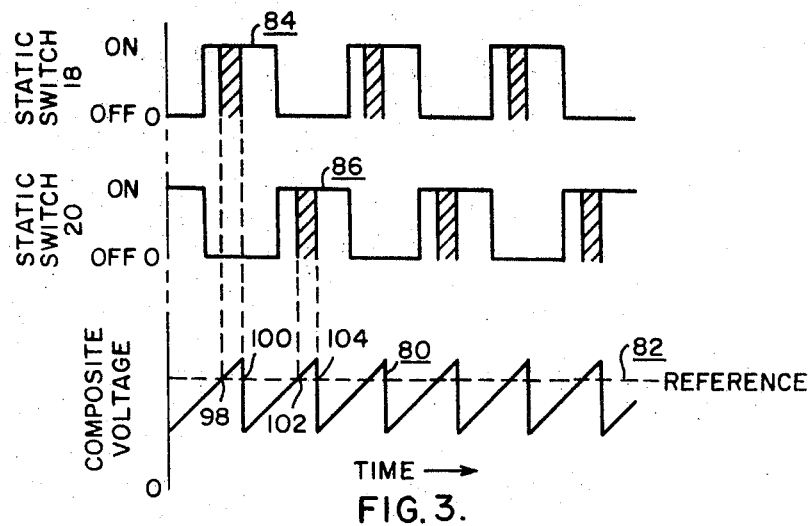
FIG. 3 is a graph illustrating improper operation of the apparatus shown in FIG. 1, caused by an unsynchronized ramp function.

Referring now to the drawings, and FIG. 1 in particular, there is shown regulated power conversion apparatus 10 of the type which may utilize the teachings of the invention. Power conversion apparatus 10 includes a source 12 of unidirectional potential $V_{in}$, having positive and negative output terminals 14 and 16, respectively, power switching elements or static switches 18 and 20, each having two main electrodes and a control electrode, such as power transistors, and an output transformer 22 having primary and secondary windings 24 and 26, respectively. Primary and secondary windings 24 and 26 are center tapped at 28 and 30, respectively. The source 12 has its positive terminal 14 connected to the center tap 28 of primary winding 24, its negative terminal 16 connected to one of the main electrodes of each of the static switches 18 and 20, and the remaining main electrodes of the static switches 18 and 20 are connected to opposite ends of primary winding 24.

The static switches 18 and 20 obtain their drive from square wave oscillator 32, with static switch 18 obtaining its drive via conductors 36 and 38, and static switch 20 obtaining its drive via conductors 38' and 36'. The square wave drive voltage measured from conductor 38' to conductor 36' is 180° out of phase with the square wave voltage measured from conductor 36 to conductor 38. The static switches are thus forward biased alternately, to provide drive to static switch 18 on one half cycle of the square wave voltage, and drive to static switch 20 on the next half cycle. This switching of the source voltage 12 induces an alternating voltage into secondary winding 26, which may be rectified by rectifiers 40 and 42 connected to the ends of winding 26, and to positive output terminal 44, and by connecting the center tap 30 to the negative output terminal 46. A capacitor 48 may be connected across the output terminals 44 and 46 to smooth the output voltage $V_{out}$ appearing across terminals 44 and 46.

The output voltage $V_{out}$ may be regulated to a predetermined magnitude, to counteract changes in the input voltage $V_{in}$, or load induced changes, or both, by removing the base drive from each static switch during the half cycle of the square wave voltage that is receiving base drive, with the point at which the drive is removed determining the average DC output voltage which appears at output terminals 44 and 46. In other words, when the drive is removed, the static switch which was conductive, will switch to its non-conductive condition, thus providing primary voltage pulses having the width necessary to provide the desired average DC output potential across terminals 44 and 46. This pulse width modulation of the voltage applied to primary winding 24 is accomplished, as shown in FIG. 1, by a regulator which includes a ramp function generator 50, a voltage detector 52, a regulated source of DC potential 54, and a voltage divider which includes resistors 56 and 58 connected serially across output terminals 44 and 46 for obtaining a voltage proportional to the DC output voltage $V_{out}$.

The ramp function generator 50 is responsive to the square wave oscillator 32 via conductors 60 and 62, obtaining the signals necessary to provide synchronized, symmetrical ramp functions at a frequency equal to twice that of the output voltage of the square wave oscillator.

A voltage responsive to the voltage $V_{out}$ across output terminals 44 and 46 is obtained by connecting conductor 64 to the junction between resistors 56 and 58. The voltage across resistor 58 is added to the ramp function saw-tooth waveform voltage from ramp function generator 50, by connecting conductor 64 to the output conductor 66 of ramp function generator 50 at junction 68. This results in a composite voltage waveform which is connected to voltage detector 52 via conductor 70, where it is compared with a reference voltage. The DC potential for operating voltage detector 52 may be obtained from source 54 via conductor 72, or from a separate source of DC potential.

The output of voltage detector 52 is connected to conductors 38 and 38' via conductors 74 and 76, and 74' and 76' respectively. When the composite voltage applied to voltage detector 52 via conductor 70 is less than the reference voltage, the output of voltage detector 52 has no affect on the drive applied to static switches 18 and 20. When the composite voltage exceeds the reference voltage, the voltage detector connects conductor 74 to ground 78, causing the drive for the static switches 18 and 20 to be shunted to ground, which causes the conductive static switch to switch to its non-conductive condition.

The proper operation of the regulated power conversion apparatus 10 shown in FIG. 1 may be illustrated by using the graphs shown in FIGS. 2A, 2B and 2C. As illustrated in FIG. 2A, by generating the ramp function at twice the frequency of the square wave oscillator, and synchronizing the ramp function with the square wave voltage, each static switch may be switched at some point during the time the drive voltage is being applied thereto. Thus, the square wave voltage applied to static switch 18 may be illustrated with waveform 84, and the square wave voltage applied to static switch 20 may be illustrated with waveform 86, which waveforms are 180° out of phase with one another. If the magnitude of the composite voltage 80 is such that it exceeds the reference voltage 82 for half of its cycle, the drive will be removed from the driven switch half way through the drive cycle. Thus, when the drive voltage applied to switch 18 changes to that polarity which will cause switch 18 to switch from its non-conductive state to its conductive state, it will continue in its conductive state until the composite voltage waveform 80 crosses the reference voltage level 82 at point 86. The drive voltage is removed from the switch 18 at this point, with the remaining portion of the drive voltage cycle, which would keep switch 18 conductive if not shunted therefrom, being shown cross-hatched. In other words, the cross-hatched area represents controlled "off" time of the switches. In like manner, the next half cycle of the drive voltage, represented by waveform 86, causes static switch 20 to switch to its conductive state, and it continues in its conductive state until the next cycle of the ramp function 80 exceeds the reference voltage 82, at point 88, at which point the drive is removed from static switch 20 and it switches to its non-conductive state, as illustrated by the cross-hatched portion of the drive voltage.

If the composite voltage increases, the effect on the conductive time of the switches 18 and 20 is shown in FIG. 2B. The composite voltage 80 crosses the reference voltage 82 earlier in the drive voltage cycle, at points 90 and 92 for static switches 18 and 20, respectively, reducing the amount of time that switches 18 and 20 are conductive, to reduce the output voltage to its desired regulated magnitude.

If the composite voltage decreases, the effect on the conductive time of the switches 18 and 20 is shown in FIG. 2C. The composite voltage 80 now crosses the reference voltage 82 later in the drive cycle, at points 94 and 96 for static switches 18 and 20, respectively, increasing the amount of time switches 18 and 20 are conductive, to increase the output voltage to its desired regulated magnitude.

In order for the power conversion apparatus 10 to operate as illustrated in the graphs shown in FIGS. 2A, 2B and 2C, it is essential that the ramp function voltage, which is added to the voltage responsive to the output voltage to provide the composite voltage waveform 80, be symmetrical, and synchronized with the square wave voltage from square wave oscillator 32. If the composite voltage is not properly synchronized with the square wave voltage, the static switches may be caused to switch at twice their intended frequency, which will double their losses. This undesirable condition is represented in FIG. 3, which is a graph similar to the graphs shown in FIGS. 2A, 2B and 2C, except the composite voltage 80 is not synchronized with the drive voltages 84 and 86. As shown in FIG. 3, when the ramp function is not properly synchronized, the composite voltage 80 may cross the reference voltage 82 twice during each drive cycle for each static switch, such as points 98 and 100 for static switch 18, and points 102 and 104 for static switch 20. Thus, each switch is rendered conductive twice during each drive cycle applied thereto, which doubles its intended switching frequency.

Figure 4:
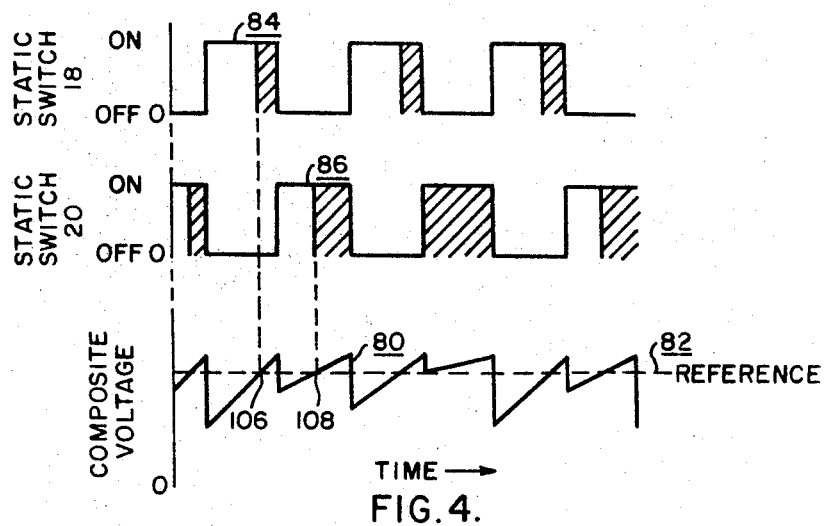
FIG. 4 is a graph illustrating improper operation of the apparatus shown in FIG. 1, caused by an unsymmetrical ramp function.

If the ramp function is not symmetrical, it may cause an unbalanced current in the output transformer, which may cause it to saturated and destroy the static switching elements. This undesirable condition is represented in FIG. 4, which is a graph similar to those shown in FIGS. 2A, 2B, 2C and 3, except the composite voltage 80 is not symmetrical. Thus, for a given magnitude of voltage responsive to the output voltage of the power conversion apparatus 10, the switching points in the drive voltage cycle may vary. For example, composite voltage 80 may cross the reference voltage magnitude 82 late in the voltage drive cycle for switch 18, such as at point 106, and then cross earlier in the drive cycle for static switch 20, such as at point 108. The accuracy of the regulator will be deleteriously affected, as well as possibly leading to saturation of the output transformer.

Figure 5:
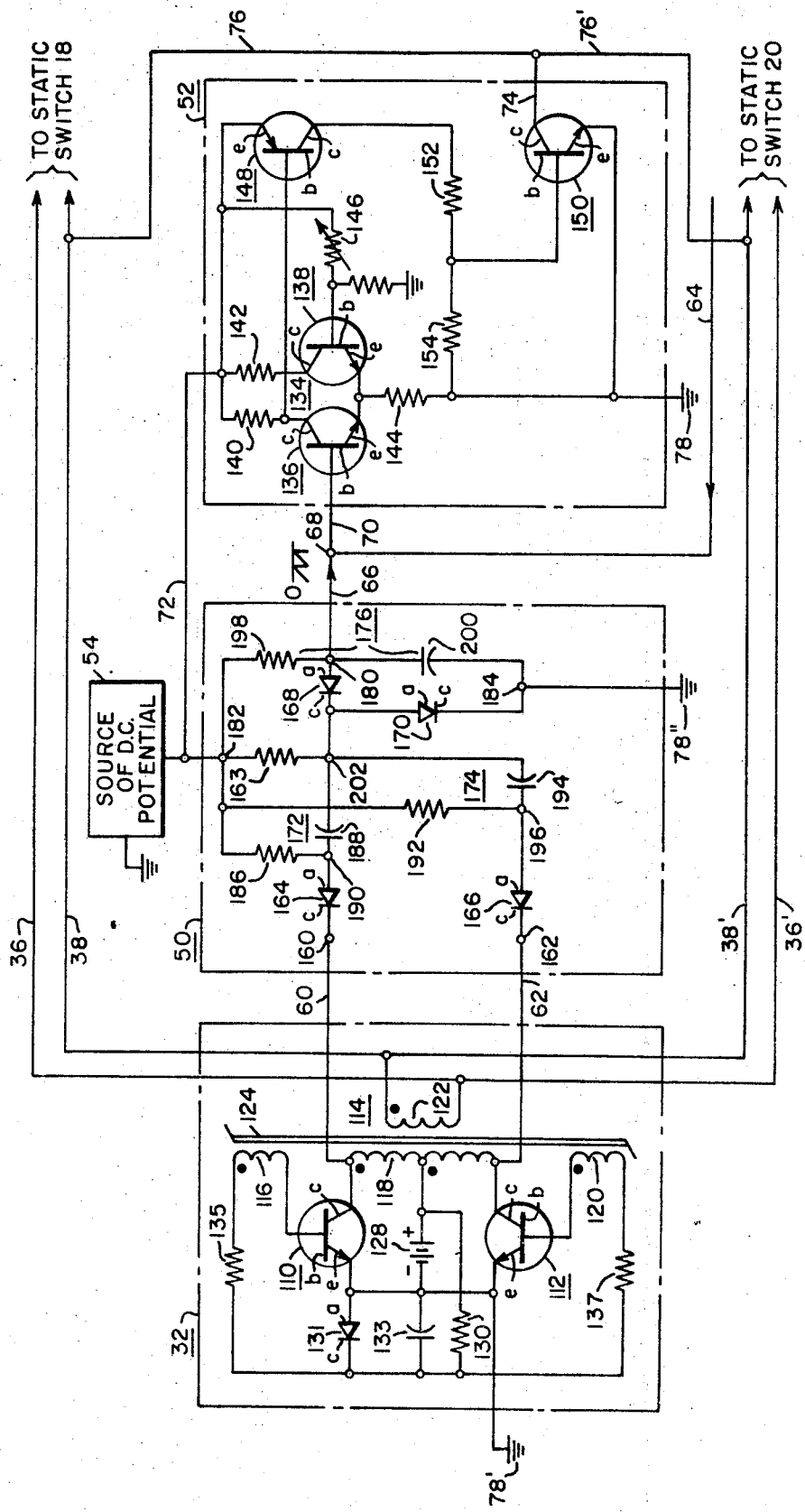
FIG. 5 is a schematic diagram illustrating a square wave oscillator, ramp function generator, and voltage detector circuit which may be used in the schematic and block diagram shown in FIG. 1, with the ramp function generator being constructed according to the teachings of the invention.

FIG. 5 is a schematic diagram of a ramp function generator 50 constructed according to the teachings of the invention, which will provide a symmetrical ramp function, properly synchronized with the output voltage from square wave oscillator 32. Schematic diagrams of a suitable square wave oscillator 32 and voltage detector 52 are also shown in FIG. 5, in order to clearly illustrate the connections of the ramp function generator 50 in the complete regulated power conversion apparatus 10.

Square wave oscillator 32 may be of any suitable type, such as the transistor inverter shown in FIG. 5, having two NPN junction type transistors 110 and 112, a transformer 114 having a plurality of windings 116, 118, 120 and 122 disposed on a saturable magnetic core 124 which has a substantially rectangular hysteresis loop, a unidirectional voltage source which is to be inverted, represented by battery 128, which has its negative terminal grounded at 78', a blocking diode 131, a capacitor 133, current limiting resistors 135 and 137, and a starting resistor 130. The transistors 110 and 112 are connected in a common emitter circuit, with their emitter electrodes being connected in common and to the negative terminal of the source voltage 128. The positive terminal of source 128 is connected to a center tap on winding 118, and the ends of winding 118 are connected to the collector electrodes of transistors 110 and 112. Winding 116 is connected to provide base drive for transistor 110, and winding 120 is connected to provide base drive for transistor 112. The operation of square wave oscillator 32 is well known in the art, for example, as described in detail in U.S. Pat. 2,783,384 issued Feb. 26, 1957 to Bright et al., which patent is assigned to the same assignee as the present application. The square wave voltage generated in winding 122 of transformer 114 has a frequency dependent upon the magnitude of the voltage source 128 and the saturation characteristics of the magnetic core 124. The square wave voltage developed in winding 122 is connected to static switch 18 via conductors 36 and 38, and to static switch 20 via conductors 36' and 38'.

The voltage detector 52 may be of any suitable type which will perform the function of comparing the composite voltage waveform with a reference voltage, and ground the drive for the static switches when the composite voltage waveform magnitude exceeds the magnitude of the reference voltage. As shown in FIG. 5, the voltage detector 52 may include a differential amplifier 134, which includes two NPN junction transistors 136 and 138, and resistors 140, 142, 144 and 146, a PNP junction transistor 148, an NPN junction transistor 150, and resistors 152 and 154. Transistors 136 and 138 have their collector electrodes connected to the source 54 of DC potential through resistors 140 and 142, respectively, and their emitter electrodes connected to ground through resistor 144. A reference voltage is applied to the base electrode $b$ of transistor 138 through resistor 146, with resistor 146 being adjustable if desired, in order to change the magnitude of the regulated output voltage. Resistor 146 may be connected to DC source 54. The composite voltage, comprising the voltage responsive to the output voltage obtained via conductor 64, and the ramp voltage from ramp function generator 50, is applied to the base electrode $b$ of transistor 136. When the reference voltage exceeds the composite voltage, transistor 138 will be conductive and transistor 136 will be cut-off. When the composite voltage exceeds the reference voltage, transistor 136 will switch to its conductive state and transistor 138 will be cut-off. This operation of differential amplifier 134 is used to obtain the desired function of voltage detector 52, by connecting the base electrode $b$ of transistor 148 to the collector electrode $c$ of transistor 136, its emitter electrode $e$ to DC source 54, and its collector electrode $c$ to the base electrode $b$ of transistor 150 through resistor 152. Transistor 150 has its base electrode $b$ connected to ground 78 through resistor 154, its emitter electrode $e$ connected to ground 78, and its collector electrode $c$ connected to conductor 74, and hence to conductors 38 and 38' via conductors 76 and 76', respectively.

When the reference voltage exceeds the composite voltage input, transistor 138 will become conductive and transistor 136 will be cut-off. Since transistor 136 is cut-off, transistor 148 does not have base drive and it is cut-off. Since transistor 148 is cut-off, transistor 150 will not have base drive and it will be cut-off. Thus, the connection of the collector electrode $c$ of transistor 150 to the drive conductors 38 and 38' does not affect the operation of the power conversion apparatus 10.

However, when the composite input voltage exceeds the reference voltage, transistor 136 will conduct and provide base drive for transistor 148 across resistor 140, switching transistor 148 to its conductive state. When transistor 148 conducts, it provides base drive for transistor 150, switching it to its conductive state. When transistor 150 becomes conductive, it will shunt the base drive from conductors 38 and 38' to ground 78 through its collector-emitter junction. Thus, voltage detector circuit 52 will provide the desired function of controlling the off time of the static power switches in the power conversion apparatus 10 shown in FIG. 1.

The ramp function generator 50, in general, includes first and second input terminals 160 and 162, which are adapted for connection to the square wave oscillator 32, a resistor 163, first, second, third and fourth asymmetrically conductive devices, each having cathode and anode electrodes, such as silicon semiconductor rectifiers or diodes, first, second and third R-C circuits 172, 174 and 176, respectively, each having serially connected resistance and capacitance means, output terminal means including terminal 180 which is adapted for connection to the voltage detector 52, a terminal 182 adapted for connection to the source 54 of DC potential, and a terminal 184 adapted for connection to ground 78". The first R-C circuit 172 includes resistor 186 and capacitor 188 connected together at junction 190, the second R-C circuit 174 includes resistor 192 and capacitor 194 connected together at junction 196, and the third R-C circuit includes resistor 198 and capacitor 200 connected together at junction 180, which junction is also the output terminal of the ramp function generator.

The first and second R-C circuits 172 and 174 are each connected from terminal 182, and thus to the source 54 of DC potential, to ground 78" through diode 170, and the third R-C circuit 176 is connected between terminal 182 and ground 78". More specifically, the unconnected ends of resistors 186 and 192 of the first and second R-C circuits 172 and 174, respectively, are connected to terminal 182, and the unconnected ends of capacitors 188 and 194 of the first and second R-C circuits, respectively, are connected to the anode electrode $a$ of diode 170 at junction 202. The unconnected end of resistor 198 of the third R-C circuit 176 is connected to terminal 182, and the unconnected end of capacitor 200 of the third R-C circuit is connected to terminal 184, and thus to ground 78".

The first diode 164 has its cathode electrode $c$ connected to input terminal 160 and its anode electrode $a$ connected to the junction 190 between the resistor and capacitor of the first R-C circuit 172, the second diode 166 has its cathode electrode $c$ connected to input terminal 162 and its anode electrode $a$ connected to the junction 196 between the resistor and capacitor of the second R-C circuit 174, the third diode 168 has its anode electrode $a$ connected to output terminal 180 and its cathode electrode $c$ connected to junction 202, and the fourth diode 170 has its anode electrode $a$ connected to junction 202 and its cathode electrode $c$ connected to terminal 184, and thus to ground 78". Resistor 163 is connected from terminal 182 to junction 202.

Input terminals 160 and 162 of ramp function generator 50 are connected to be responsive to the switching of transistors 110 and 112, respectively, in the square wave oscillator 32, with input terminal 160 being connected to the collector electrode $c$ of transistor 110 via conductor 60, and input terminal 162 being connected to the collector electrode $c$ of transistor 112 via conductor 62. Thus, the input terminals 160 and 162 will alternate between substantially ground potential and a positive voltage, as their associated transistors switch between cut-off and saturation in the square wave oscillator 32. For example, when transistor 110 is conductive, transistor 112 will be cut-off, input terminal 162 will be effectively connected to the positive terminal of DC source 128, and input terminal 160 will be effectively connected to ground 78'. When transistor 112 becomes conductive, transistor 110 will be cut-off, input terminal 162 will be effectively connected to ground 78', and input terminal 160 will be connected to the positive terminal of source 128.

The series circuit comprising resistor 163 and diode 170, connected between terminals 182 and 184, causes junction 202 to be clamped to approximately ground potential, and diode 168 isolates the third R-C circuit 176 from the remainder of the circuit.

In describing the operation of the ramp function generator 50, it will first be assumed that transistor 110 is cut-off, and transistor 112 is conductive. Thus, input terminal 160 is at a positive potential and input terminal 160 is at a positive potential and input terminal 162 is substantially at ground potential. Since both ends of capacitor 194 of the second R-C circuit 174 will be at substantially ground potential, it will have very little charge. Diode 164, however, will be reverse biased, and therefore blocking, which allows capacitor 188 of the first R-C circuit 172 to charge from DC source 54 through resistor 186 to substantially the potential of the DC source 54. Capacitor 200 will have very little charge, since junction 202 is clamped to ground, and diodes 168 and 170 are serially connected across capacitor 200 and of such polarity to prevent capacitor 200 from building up a positive charge at output terminal 180.

Figure 6:
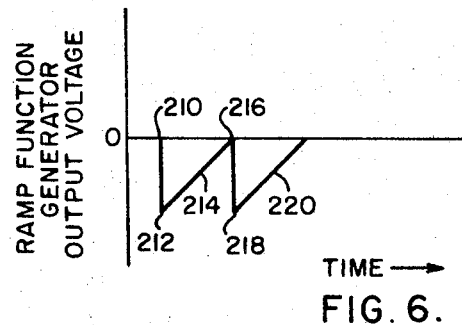
FIG. 6 is a graph illustrating the ramp function voltage provided by the ramp function generator shown in FIG. 5.

At the instant transistors 110 and 112 in the square wave oscillator 32 change conductive states, i.e., transistor 110 becomes conductive and transistor 112 becomes cut-off, the charged capacitor 188 and capacitor 200 will be connected in series, with the series circuit starting at ground 78" and including capacitor 200, diode 168, capacitor 188, diode 164, the conductive transistor 110, and ending at ground 78'. Since the ground 78' for the square wave oscillator 32 is in common with the ground 78" for the ramp function generator 50, the series circuit will be complete. This momentary series connection, during the short time the transistors 110 and 112 are switching, allows the charge on capacitor 188 to be distributed between capacitor 188 and capacitor 200, in a manner dependent upon the values of their capacitance. Thus, as shown in FIG. 6, which is a graph of the output voltage of the ramp function generator 50, the voltage across capacitor 200 changes almost instantaneously from substantially zero or ground at point 210, to a negative magnitude as indicated at point 212. The value of the negative voltage at point 212 will be determined by the magnitude of the source voltage 54 and the relative magnitudes of capacitors 188 and 200.

After the transistors 110 and 112 have switched to their new operating modes, the third R-C circuit 176 will again be isolated from the rest of the circuit by diode 168, and capacitor 200 will discharge towards ground with the time constant determined by resistor 198, along ramp 214, as illustrated in FIG. 6.

While capacitor 200 is discharging along ramp 214, capacitor 194 of the second R-C circuit will charge to the value of the source voltage 54 through resistor 192, since input terminal 162 will now be positive, causing diode 166 to be reverse biased, and capacitor 188 will have very little charge since input terminal 160 will be at substantially ground potential.

When the transistors 110 and 112 again change conductive conditions, at the end of the next half cycle of the square wave voltage, capacitor 200 will be effectively connected in series with charged capacitor 194, with the charge on capacitor 194 being distributed between capacitors 194 and 200. Thus, the voltage across capacitor 200 will again become negative, starting at substantially ground potential at point 216, and dropping almost instantaneously to a negative charge having a magnitude indicated at point 218. If capacitors 188 and 194 are closely matched in value, the negative voltage across capacitor 200 will be substantially the same at points 212 and 218. When transistors 110 and 112 have passed through their switching stage, diode 168 will isolate the third R-C circuit 176, and capacitor 200 will discharge towards ground along ramp 220. Since the charge on capacitor 200 was substantially the same at points 212 and 218, and since capacitor 200 discharges through the same resistor 198 after each negative charge, the ramps 214 and 220 will have the same slope. The R-C time constant of the third R-C circuit 176 should preferably be chosen such that it does not reach ground potential before the next half cycle of the square wave oscillator. It is satisfactory to have an R-C time constant longer than one-half cycle of the square wave oscillator, since the capacitor would be discharged to the same point after each half cycle, thus providing a symmetrical saw-tooth waveform.

The voltage appearing across capacitor 200 is, therefore, a ramp function, completing a full cycle during each half cycle of the square wave voltage from the square wave oscillator 32, and it is synchronized therewith. By connecting the output voltage which appears across capacitor 200 to add to the unidirectional voltage responsive to the voltage to be regulated, such as by connecting terminal 180 to conductor 64 at junction 68, a composite unidirectional voltage having a saw-tooth waveform or ripple will be produced. The saw-tooth voltage has twice the frequency of the square wave voltage provided by the square wave oscillator 32, which oscillator is providing base drive for the static switches 18 and 20. Thus, the composite voltage may control the "off" time of each static switch during the period of time that it would be conductive without the overriding control by the voltage detector 52.

In summary, there has been disclosed a new and improved ramp function generator for providing symmetrical ramp functions, synchronized with the output voltage of a square wave oscillator, and having a frequency equal to twice that of the oscillator. The ramp function generator is inexpensive to construct, eliminating the requirement for a three terminal switching device, and it is more reliable than prior art circuits which utilize such three terminal devices, as it insures a symmetrical, synchronized ramp function.

While the ramp function generator 50 has been described as being part of a single-phase voltage regulating system, it is to be understood that it may be used in polyphase voltage regulating systems, and also in single and polyphase regulators which regulate parameters other than voltage, such as current and speed.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A ramp function generator for providing a saw-tooth voltage waveform in response to a square wave oscillator of the type having first and second switching devices which are alternately conductive, comprising:
   first and second input terminals adapted to be responsive to the first and second switching devices, respectively, of the square wave oscillator,
   a source of unidirectional potential,
   first, second and third capacitor means,
   means connecting said first and second capacitor means to said source of unidirectional potential,
   means connecting said first and second capacitor means to said first and second input terminals, respectively, for alternately charging said first and second capacitor means from said source of unidirectional potential, in response to the conductive states of the first and second switching devices,
   means effectively connecting the charged capacitor means and said third capacitor means in series circuit relation, each time the first and second switching devices in the square wave oscillator switch, to distribute the charge on the charged capacitor means between the two serially connected capacitor means,
   means discharging said third capacitor means at a predetermined rate each time it is charged by the charge redistribution from the charged capacitor means,
   and output terminal means connected across said third capacitor means, providing a saw-tooth voltage waveform having a frequency equal to twice the frequency of the square wave oscillator and synchronized therewith.

2. The ramp function generator of claim 1 wherein the means connecting said first and second capacitor means to said first and second input terminals, respectively, includes asymmetrically conductive devices, respectively, poled to allow a current flow towards said first and second input terminals.

3. The ramp function generator of claim 1 wherein the means for effectively connecting the charged capacitor means and said third capacitor means in series circuit relation each time the first and second switching devices switch, includes an asymmetrically conductive device poled to allow the charge redistribution.

4. A ramp function generator for providing a saw-tooth voltage waveform in response to a square wave oscillator of the type having first and second switching devices which are alternately conductive, comprising:
   first and second input terminals adapted for connection to the first and second switching devices, respectively, of the square wave oscillator,
   first, second, third and fourth asymmetrically conductive devices,
   first, second and third R-C circuits, each having first and second ends, and resistance and capacitance means serially connected between said first and second ends,
   the first ends of said first and second R-C circuits being adapted for connection to a source of unidirectional potential,
   said first and second asymmetrically conductive devices being connected from said first and second input terminal means, respectively, to the junctions between the resistance and capacitance means in said first and second R-C circuits, respectively,
   said third asymmetrically conductive means having one side connected to the second ends of said first and second R-C circuits, and its other side adapted for connection to ground,
   said third R-C circuit being adapted for connection between a source of unidirectional potential and ground,
   said fourth asymmetrically conductive device being connected from the junction between said resistance and capacitance means of said third R-C circuit to the junction between said third asymmetrically conductive means and the second ends of said first and second R-C circuits,
   and output terminal means connected across the capacitance means of said third R-C circuit,
   said first, second, third and fourth asymmetrically conductive devices being poled to alternately charge the capacitance means of said first and second R-C circuits in response to the conductive condition of the first and second switching devices in the square wave oscillator, to effectively connect the charged capacitance means in series with the capacitance means of said third R-C circuit when the first and second switching devices of the square wave oscillator switch, to distribute the charge between the two serially connected capacitance means, and to discharge the capacitance means of said third R-C circuit at a predetermined rate each time it is charged, to provide a saw-tooth voltage waveform at said output terminal means having a frequency twice that of the square wave oscillator, and synchronized therewith.

5. The ramp function generator of claim 4 wherein said first, second, third and fourth asymmetrically conductive devices are rectifiers, each having an anode and a cathode electrode, with said first and second asymmetrically conductive devices having their cathode electrodes connected to said first and second input terminal means, respectively, said third asymmetrically conductive device having its anode electrode connected to the second ends of said first and second R-C circuits, and with said fourth asymmetrically conductive device having its anode electrode connected to the junction between the resistance and capacitance means of said third R-C circuit.

References Cited

UNITED STATES PATENTS

| 3,027,515 | 3/1962 | Clark et al. | 328—34X |
| 3,333,109 | 7/1967 | Updike | 307—261X |

STANLEY D. MILLER, Primary Examiner

U.S. Cl. X.R.

307—228, 246, 261, 294; 328—181